United States Patent
Nishida

(10) Patent No.: US 11,450,343 B2
(45) Date of Patent: Sep. 20, 2022

(54) MAGNETIC DISK DEVICE AND INFORMATION MANAGEMENT METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Masatsugu Nishida, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/198,137

(22) Filed: Mar. 10, 2021

(65) Prior Publication Data
US 2022/0084547 A1 Mar. 17, 2022

(30) Foreign Application Priority Data
Sep. 14, 2020 (JP) .............................. JP2020-153963

(51) Int. Cl.
G11B 5/55 (2006.01)

(52) U.S. Cl.
CPC ............ *G11B 5/5573* (2013.01); *G11B 5/553* (2013.01)

(58) Field of Classification Search
None
See application file for complete search history.

(56) References Cited

U.S. PATENT DOCUMENTS

| | | |
|---|---|---|
| 5,574,881 A | 11/1996 | Yasuoka et al. |
| 10,424,328 B1 | 9/2019 | Gaertner et al. |
| 10,482,911 B1 | 11/2019 | Nanjunda Swamy |
| 10,657,995 B2 | 5/2020 | Shimokawa et al. |
| 2020/0090690 A1 | 3/2020 | Shimokawa et al. |
| 2020/0294540 A1 | 9/2020 | Shimokawa |

*Primary Examiner* — Craig A. Renner
(74) *Attorney, Agent, or Firm* — Kim & Stewart LLP

(57) ABSTRACT

According to one embodiment, a magnetic disk device includes a first disk having a first user data region and a first system area, a second disk having a second user data region and a second system area, a first head that writes data to the first disk, a second head that writes data to the second disk, a first actuator having the first head, a second actuator having the second head, a first controller that controls the first disk, the first head, and the first actuator, and a second controller that controls the second disk, the second head, and the second actuator, wherein the first controller records first information related to the first head and the first disk in the second system area.

20 Claims, 11 Drawing Sheets

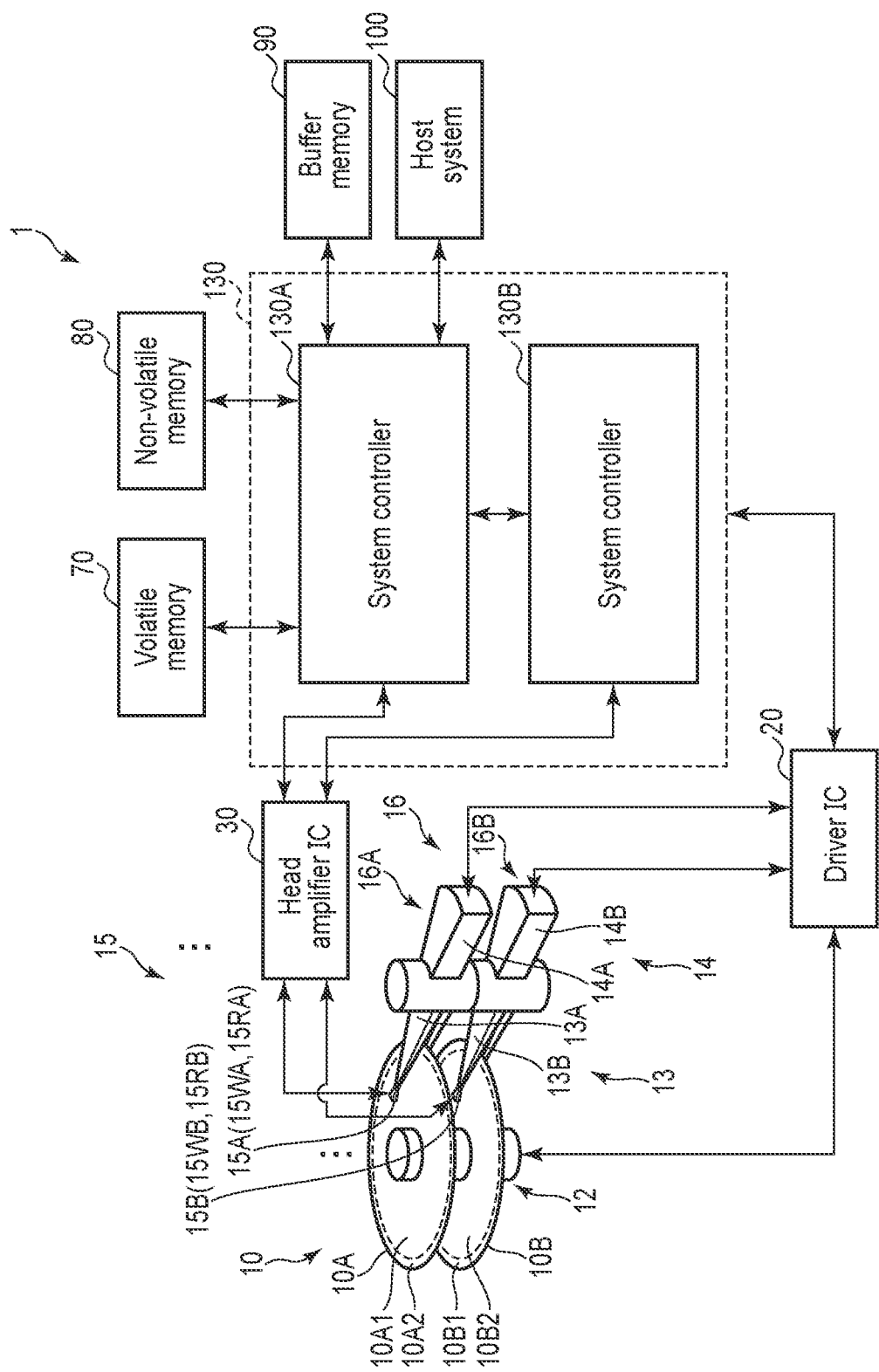
F I G. 1

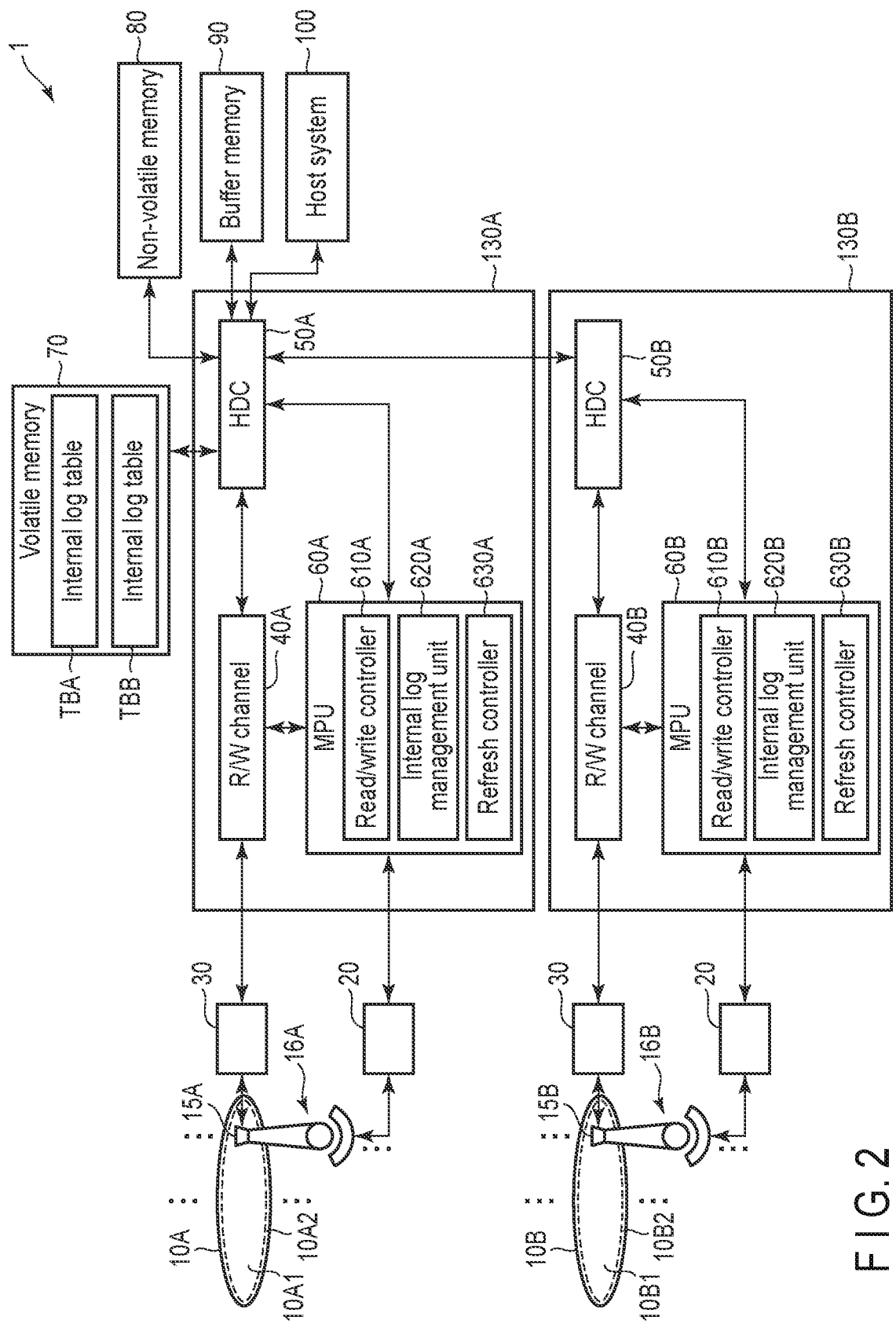
F I G. 2

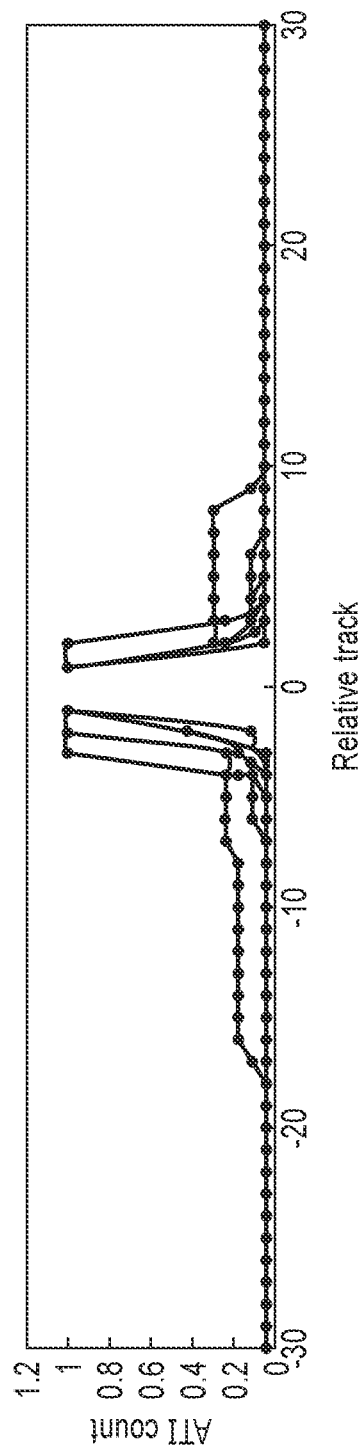
F I G. 3

| | 00 | 01 | 02 | 03 | 04 | 05 | 06 | 07 | 08 | 09 | 0A | 0B | 0C | 0D | 0E | 0F |
|---|---|---|---|---|---|---|---|---|---|---|---|---|---|---|---|---|
| 000000 | "A" | "T" | "I" | "B" | HEAD number | | | | | | Reserve | | | | | |
| 000010 | Time Stamp[sec] | | | | | | | | Reserve | | | | | | | |
| 000020 | ATI count of Cyl. 0 | | ATI count of Cyl. 1 | | ATI count of Cyl. 2 | | ATI count of Cyl. 3 | | ATI count of Cyl. 4 | | ATI count of Cyl. 5 | | ATI count of Cyl. 6 | | ATI count of Cyl. 7 | |
| 000030 | Cyl.8 | | Cyl.9 | | Cyl.10 | | Cyl.11 | | Cyl.12 | | Cyl.13 | | Cyl.14 | | Cyl.15 | |
| 000040 | Cyl.16 | | Cyl.17 | | Cyl.18 | | Cyl.19 | | ..... | | ..... | | ..... | | ..... | |
| .... | | | | | | | | | | | | | | | | |
| ... | | | | | | | | | | | | | | | | |
| 13FFD0 | .... | | .... | | .... | | .... | | .... | | .... | | .... | | .... | |
| 13FFE0 | .... | | .... | | .... | | .... | | .... | | .... | | .... | | .... | |
| 13FFF0 | Cyl.655336 | | Cyl.655337 | | Cyl.655338 | | Cyl.655339 | | Cyl.655340 | | Cyl.655341 | | Cyl.655342 | | Cyl.655343 | |

TBA,TBB

F I G. 4

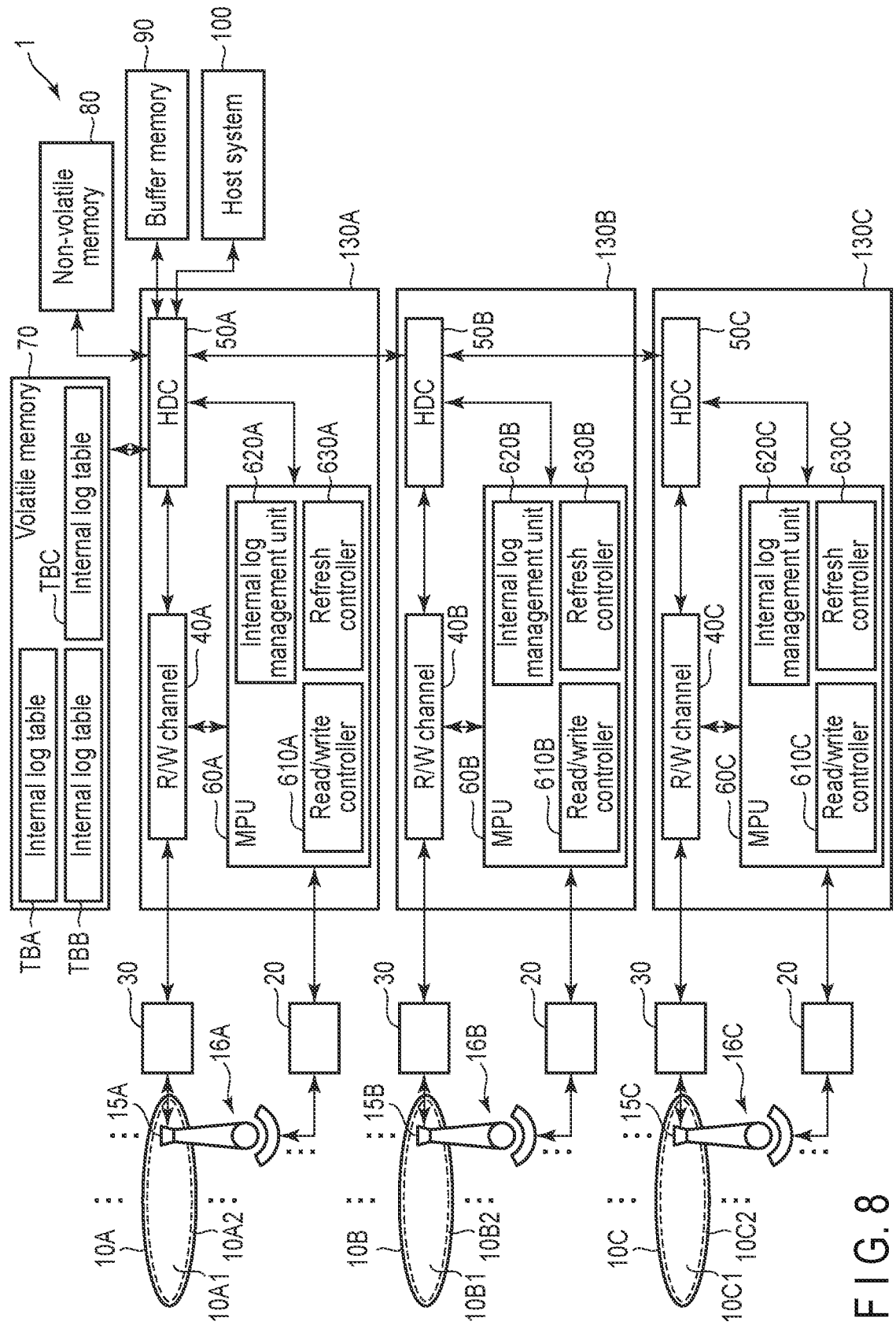
F I G. 8

MAGNETIC DISK DEVICE AND INFORMATION MANAGEMENT METHOD

CROSS-REFERENCE TO RELATED APPLICATIONS

This application is based upon and claims the benefit of priority from Japanese Patent Application No. 2020-153963, filed Sep. 14, 2020, the entire contents of which are incorporated herein by reference.

FIELD

Embodiments describes herein relate generally to a magnetic disk device and an information management method.

BACKGROUND

For a magnetic disk device, a side erasure where data is erased can occur due to the influence of leakage magnetic flux or the like (Adjacent Track Interference: ATI) from the head when data is written. The ATI depends on, for example, the characteristics of the head, the track per inch (TPI) setting value, the write current setting value, and the like. To prevent the side erasure, the magnetic disk device has a function (refresh function) to rewrite the data of a particular track, when the degree (or the number of times) of influence of leakage magnetic flux or the like (hereinafter, may be referred to as an ATI count) from the head, corresponding to the number of times of writing data to a surrounding track of a particular track, reaches the specified number of counts. The magnetic disk device records and manages the ATI count as a table in a particular recording region.

Further, in recent years, as the recording capacity of the magnetic disk device has increased, the number of magnetic disks has also increased. In order to cope with the increase in the number of magnetic disks, the so-called split actuator magnetic disk device having a plurality of actuators, for example, two actuators, has been proposed. The split actuator magnetic disk device includes a plurality of controllers that controls a plurality of respective actuators. The split actuator magnetic disk device records and manages the number of ATIs for each actuator as a table in a particular recording region.

BRIEF DESCRIPTION OF THE DRAWINGS

FIG. 1 is a block diagram showing a magnetic disk device according to an embodiment.

FIG. 2 is a schematic diagram showing a configuration example of the system controller according to the embodiment.

FIG. 3 is a schematic diagram showing an example of the ATI count to be increased for the surrounding region according to the number of times data is written to a particular track 0.

FIG. 4 is a schematic diagram showing an example of the internal log table.

FIG. 8 is a schematic diagram showing a configuration example of the system controller according to Modification 1.

DETAILED DESCRIPTION

Figure 5:
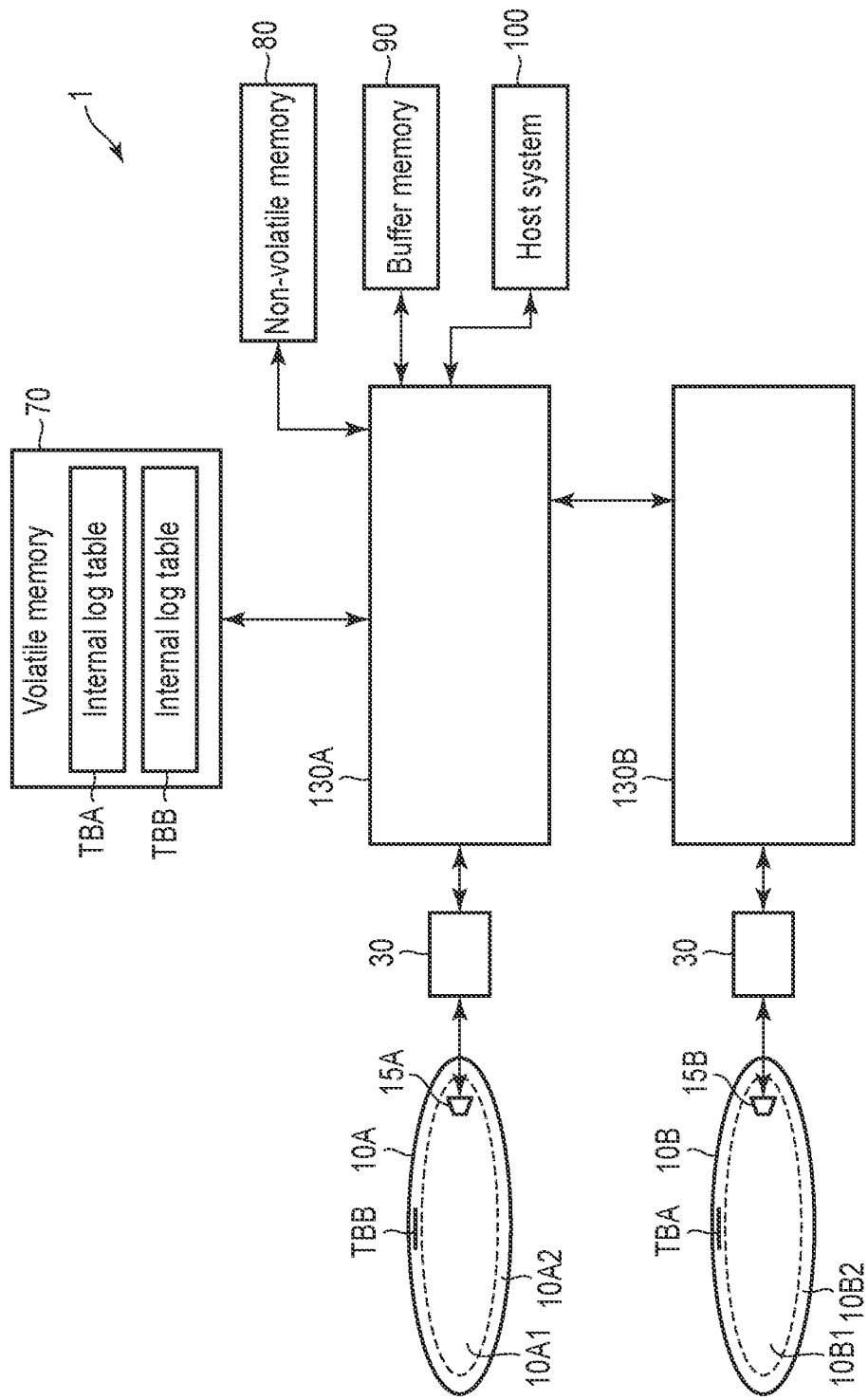
FIG. 5 is a schematic diagram showing an example of the management method of the internal log table according to the embodiment.

In general, according to one embodiment, a magnetic disk device comprises: a first disk having a first user data region to which user data is written and a first system area different from the first user data region; a second disk having a second user data region to which user data is written and a second system area different from the second user data region; a first head that writes data to the first disk and that reads data from the first disk; a second head that writes data to the second disk and that reads data from the second disk; a first actuator having the first head; a second actuator having the second head; a first controller that controls the first disk, the first head, and the first actuator; and a second controller that controls the second disk, the second head, and the second actuator, wherein the first controller records first information related to the first head and the first disk in the second system area.

Hereinafter, embodiments will be described with reference to the drawings. It should be noted that the drawings are merely examples and do not limit the scope of the invention.

Embodiments

FIG. 1 is a block diagram schematically showing a magnetic disk device 1 according to an embodiment.

The magnetic disk device 1 includes a head disk assembly (HDA) described later, a driver IC 20, a head amplifier integrated circuit (hereinafter referred to as a head amplifier IC or a preamplifier) 30, a volatile memory 70, a buffer memory (buffer) 50, a nonvolatile memory 80, and a system controller 130 which is an integrated circuit of one chip. Further, the magnetic disk device 1 is connected to a host system (hereinafter simply referred to as a host) 100. The magnetic disk device 1 is a split actuator magnetic disk device that can independently drive a plurality of, for example, two actuators 16 described later. The magnetic disk device 1 may have more than two actuators 16.

The HDA includes a magnetic disk (hereinafter referred to as a disk) 10, a spindle motor (hereinafter referred to as an SPM) 12, an arm 13 on which a head 15 is mounted, a voice coil motor (hereinafter referred to as a VCM) 14. The disk 10 is attached to the spindle motor 12 and rotates by driving the spindle motor 12. The disk 10 has, for example, disks 10A and 10B. The disk 10 may have three or more disks. Further, the disks 10A and 10B may each have two or more disks. The arm 13 has, for example, arms 13A and 13B. The arm 13 may have three or more arms. The arms 13A and 13B may each have two or more arms. The VCM 14 has, for example, VCM 14A and 14B. The VCM 14 may have three or more VCMs. The head 15 has, for example, heads 15A and 15B. The head 15 may have three or more heads. Further, the heads 15A and 15B may each have two or more heads. For example, the head 15A is mounted on the arm 13A. Further, for example, the head 15B is mounted on the arm 13B.

The actuator 16 has actuators 16A and 16B. The actuator 16 may have three or more actuators. The actuators 16A and 16B are mounted on a common pivot and can rotate independently around the pivot. The actuator 16A includes the arm 13A and the VCM 14A. The actuator 16A may include a head 15A, a driver IC 20, and a head amplifier IC 30. The actuator 16A controls the movement of the head 15A mounted on the arm 13A to a particular position on the disk 10A by driving the VCM 14A. The actuator 16B includes the arm 13B and the VCM 14B. The actuator 16B may include a head 15B, a driver IC 20, and a head amplifier IC 30. The actuator 16B controls the movement of the head 15B mounted on the arm 13B to a particular position on the disk 10B by driving the VCM 14B.

In the disk 10, a user data region that can be used by a user and a system area to which information necessary for the system management is written are allocated in a region to which the data can be written. For example, the disk 10A is allocated a user data region 10A1 and a system area 10A2. For example, the disk 10B is allocated a user data region 10B1 and a system area 10B2. Hereinafter, a direction orthogonal to the radial direction of the disk 10 is referred to as a circumferential direction.

The head 15 has a slider as a main body, and has a write head and a read head mounted on the slider. The write head writes data to disk 10. The read head reads the data written to the disk 10. For example, the head 15A includes a write head 15WA that writes data to the disk 10A and a read head 15RA that reads the data written to the disk 10A. For example, the head 15B includes a write head 15WB that writes data to the disk 10B and a read head 15RB that reads the data written to the disk 10B.

The driver IC 20 controls the drive of the SPM 12 and the VCM 14 according to the control of the system controller 130. In other words, the driver IC 20 controls the drive of the SPM 12 and the actuators 16 (actuators 16A and 16B) according to the control of the system controller 130. The plurality of driver ICs 20 may be provided according to the number of actuators 16. For example, the driver IC 20 may include a driver IC that controls the drive of the actuator 16A according to the control of the system controller 130 (for example, a microprocessor (Micro-processing unit: MPU) 60A described later), and a driver IC that controls the drive of the actuator 16B according to the control of the system controller 130 (for example, an MPU 60B described later).

The head amplifier IC (preamplifier) 30 includes a read amplifier and a write driver. The read amplifier amplifies the read signal read from the disk 10 (disks 10A and 10B) to output it to the system controller 130 (more specifically, read/write (R/W) channels 40A and 40B to be described later). The write driver outputs a write current corresponding to a signal output from the system controller 130 (for example, the R/W channels 40A and 40B described later) to the head 15. The plurality of head amplifier ICs 30 may be provided according to the number of actuators 16. For example, the head amplifier IC 30 includes a head amplifier IC that signal processes the read signal read from the disk 10A by the head 15A mounted on the actuator 16A, and a head amplifier IC having a read amplifier that processes the read signal read from the disk 10B by the head 15B mounted on the actuator 16B.

The volatile memory 70 is a semiconductor memory from which stored data is lost when power supply is cut off. The volatile memory 70 stores data and the like necessary for processing in respective units of the magnetic disk device 1. The volatile memory 70 is, for example, a dynamic random access memory (DRAM) or a synchronous dynamic random access memory (SDRAM).

The nonvolatile memory 80 is a semiconductor memory that records data stored even when power supply is cut off. The nonvolatile memory 80 is, for example, a NOR type or NAND type flash read only memory (FROM).

The buffer memory 90 is a semiconductor memory that temporarily records data and the like transmitted and received between the magnetic disk device 1 and a host 100. It is to be noted that the buffer memory 90 may be formed integrally with the volatile memory 70. The buffer memory 90 is, for example, a DRAM, a static random access memory (SRAM), an SDRAM, a ferroelectric random access memory (FeRAM), a magnetoresistive random access memory (MRAM), or the like.

The system controller (controller) 130 is implemented by using a large scale integrated circuit (LSI) referred to as the System-on-a-Chip (SoC) in which a plurality of elements is integrated on a single chip, for example. The system controller 130 is electrically connected to the driver IC 20, the head amplifier IC 30, the volatile memory 70, the buffer memory 90, the nonvolatile memory 80, and the host system 100. The system controller 130 includes, for example, the system controllers 130A and 130B. For example, the system controller 130A is electrically connected to the driver IC 20, the volatile memory 70, the buffer memory (buffer) 50, the nonvolatile memory 80, and the system controller 130B. Further, the system controller 130A is connected to the host 100. For example, the system controller 130B is electrically connected to the driver IC 20, the head amplifier IC 30, and the system controller 130A. The system controller 130 may have three or more system controllers 130.

FIG. 2 is a schematic diagram showing a configuration example of the system controller 130 according to the present embodiment.

The system controller (controller) 130A includes the read/write (R/W) channel 40A, the hard disk controller (HDC) 50A, and the microprocessor (MPU) 60A. The system controller 130A is electrically connected to the driver IC 20, the head amplifier IC 30, the volatile memory 70, the nonvolatile memory 80, the buffer memory 90, the system controller 130B, the host 100, and the like.

The R/W channel 40A executes a signal process of read data transferred from the disk 10A to the host 100 and write data transferred from the host 100 in response to an instruction from an MPU 60A to be described later. The R/W channel 40A has a circuit or a function of measuring a signal quality of read data. The R/W channel 40A is electrically connected to the head amplifier IC 30, the HDC 50A, the MPU 60A, and the like, for example.

The HDC 50A controls data transfer between the host 100 and the R/W channel 40A in response to an instruction from the MPU 60A described later. The HDC 50A is electrically connected to, for example, the R/W channel 40A, the MPU 60A, the system controller 130B, the volatile memory 70, the nonvolatile memory 80, the buffer memory 90, the host 100, and the like.

The MPU 60A is a controller that controls respective units of the magnetic disk device 1. The MPU 60A controls the actuator 16A (VCM 14A) via the driver IC 20 and executes servo control that positions the head 15A. The MPU 60A controls a write operation of the data to the disk 10A and selects the storage destination of the write data. In addition, the MPU 60A controls a read operation of the data from the disk 10A and controls the process of the read data. The MPU 60A is connected to each unit of the magnetic disk device 1. The MPU 60A is electrically connected to the driver IC 20, the R/W channel 40A, the HDC 50A, and the like, for example.

The MPU 60A includes a read/write controller 610A, an internal log management unit 620A, and a refresh processing unit 630A. The MPU 60A executes the process of each of these units, for example, the read/write controller 610A, the internal log management unit 620A, and the refresh processing unit 630A on the firmware. The MPU 60A may include the respective units, for example, the read/write controller 610A, the internal log management unit 620A, the refresh processing unit 630A, and the like as circuits.

The read/write controller 610A controls the read process and the write process of data according to a command from the host 100. The read/write controller 610A controls the VCM 14 via the driver IC 20, positions the head 15A at a target position on the disk 10A, and reads or writes data. Hereinafter, the term "access" may be used including recording or writing data in a particular region, reading out or reading data from a particular region, moving the head 15 or the like to a particular region.

The internal log management unit 620A manages the state of the magnetic disk device 1, for example, the data written to the disk 10 and the data for confirming the soundness of the head 15 (hereinafter, may be referred to as an internal log). The internal log includes the data used in a self-monitoring, analysis and reporting technology (SMART), the data related to a fault (for example, defect) of the disk 10A, and the degree or the number of times (hereinafter, may be referred to as an ATI count) of influence of leakage magnetic flux or the like (Adjacent Track Interference: ATI) from the head 15A when data is written to the periphery. The internal log management unit 620A manages the internal log as a table. The internal log management unit 620A develops (disposes or temporarily stores) the internal log table (hereinafter, may be referred to as internal log table) TBA corresponding to the actuator 16A (the disk 10A, the head 15A, and the system Controller 130A) in a volatile recording region, for example, the volatile memory 70, and performs the process such as updating. For example, when the internal log table TBA is a table (hereinafter, may be referred to as an ATI management table) of the ATI count related to the ATI, every time data is written to a track located in the radial direction of a particular track, for example, to a track (hereinafter, may be referred to as an adjacent track) adjacent to the particular track in the radial direction, a particular number of times, for example, once, the internal log management unit 620A increases the ATI count corresponding to this particular track of the internal log table TBA developed to the volatile memory 70 by a particular value, for example, by one. Here, "adjacent" includes not only a state in which data, an object, a region, a space, etc., are disposed in contact with each other, but also a state in which they are disposed at a particular interval. When the internal log table TBA is the ATI management table, and the data is written to the particular track, the internal log management unit 620A clears the ATI count corresponding to this particular track of the internal log table TBA developed to the volatile memory 70, for example, makes the ATI count zero.

The internal log management unit 620A periodically records the internal log table TBA developed in the volatile recording region, for example, the volatile memory 70, in the non-volatile recording region, for example, the system area 10A2 of the disk 10A. When the internal log management unit 620A records the internal log table TBA developed in the volatile recording region, for example, the volatile memory 70, in the non-volatile recording region, for example, the system area 10A2 of the disk 10A, the internal log management unit 620A adds a time-stamp to the internal log table TBA and record it in the system area 10A2 of the disk 10A. The time-stamp corresponds to data indicating the time when the particular data was recorded in the particular recording region. For example, the time-stamp is indicated by the total time during which the magnetic disk device 1 is supplied with power (current or voltage). Therefore, the larger the time-stamp, the newer the internal log table, and the smaller the time-stamp, the older the internal log table. In other words, the internal log table having the largest time-stamp among a plurality of internal log tables with time-stamps corresponds to the newest internal log table, and the internal log table having the smallest time-stamp among a plurality of internal log tables with time-stamps corresponds to the oldest internal log table.

When the number of commands to be processed by the system controller 130A is large, or when the access frequency at which the actuator 16A is driven and the head 15A accesses the disk 10A is large, that is, when the system controller 130A is in a busy state, the internal log management unit 620A writes the internal log table TBA to the system area of another disk 10, other than the disk 10A, for example, the system area 10B2 of the disk 10B, corresponding to a system controller 130 etc., when the number of commands to be processed by the system controller 130 is small, when there are no commands to be processed by the system controller 130, when the access frequency at which the actuator 16 is driven and the head 15 accesses the disk 10 is small, or when the system controller 130 is in an idle state, that is, when the system controller 130 is not in a busy state. The "access frequency" means the number of times the head accesses a particular region within a particular time is large (high access frequency) or the number of times the head accesses a particular region within a particular time is small (low access frequency).

When the system controller 130A is not in a busy state, the internal log management unit 620A writes an internal log table corresponding to another actuator 16 (another disk 10 other than the disk 10A, another head 15 other than the head 15A, or another controller 130 other than the system controller 130A) or the like, other than the actuator 16A, controlled by another system controller 130, other than the system controller 130A, which is in a busy state, for example, the internal log table TBB corresponding to the actuator 16B (the disk 10B, the head 15B, and the system controller 130B) described later, to the non-volatile recording region, for example, to the system area 10A2 of disk 10A. When the system controller 130A is not in a busy state, the internal log management unit 620A may write the internal log table TBA to the non-volatile recording region, for example, the system area 10A2 of the disk 10A.

When the power of the magnetic disk device 1 is turned off, or when the power of the magnetic disk device 1 is cut off, the internal log management unit 620A clears the ATI count corresponding to each track of the disk 10A included in the internal log table TBA, for example, the ATI management table TBA, recorded in the volatile recording region, for example, the volatile memory 70 or the like, for example, makes the ATI count zero.

When the power of the magnetic disk device 1 is turned on (hereinafter, may be referred to as startup), the internal log management unit 620A detects the time-stamp added to the internal log table TBA corresponding to the actuator 16A (the disk 10A, the head 15A, and the system controller 130A) recorded in all non-volatile recording regions, for example, all system areas of the disk 10, and generates (constructs or reconstructs) an internal log table including the newest (for example, largest) time-stamp in a volatile recording region, for example, the volatile memory 70. The internal log management unit 620A may update the internal log table TBA recorded in all or part of the non-volatile recording region, for example, the system area of the disk 10, to the internal log table TBA generated (constructed or reconstructed) in the volatile recording region, for example, the volatile memory 70 at startup.

The refresh processing unit 630A once reads the data written to the particular recording region, and performs a process of rewriting the read data to the particular recording region (hereinafter, may be referred to as a refresh process). The refresh processing unit 630A refers to the internal log table TBA corresponding to the ATI management table, and when the ATI count corresponding to a particular track of the disk 10A exceeds a particular threshold (hereinafter, may be referred to as a refresh threshold), performs a refresh process on this track.

The system controller (controller) 130B includes an R/W channel 40B, a hard disk controller (HDC) 50B, and an MPU 60B. The system controller 130B is electrically connected to, for example, the driver IC 20, the head amplifier IC 30, the system controller 130A, and the like. The system controller 130B is electrically connected to the volatile memory 70, the nonvolatile memory 80, the buffer memory 90, the host 100, and the like via the system controller 130A.

The R/W channel 40B executes a signal process of read data transferred from the disk 10B to the host 100 and write data transferred from the host 100 in response to an instruction from the MPU 60B to be described later. The R/W channel 40B has a circuit or a function of measuring a signal quality of read data. The R/W channel 40B is electrically connected to the head amplifier IC 30, the HDC 50B, the MPU 60B, and the like, for example.

The HDC 50B controls data transfer between the host 100 and the R/W channel 40B via the HDC 50A in response to an instruction from the MPU 60B described later. The HDC 50B is electrically connected to, for example, the R/W channel 40B, the MPU 60B, and the system controller 130A (HDC 50A).

The MPU 60B is a controller that controls respective units of the magnetic disk device 1. The MPU 60B controls the actuator 16B (VCM 14B) via the driver IC 20 and executes servo control that positions the head 15B. The MPU 60B controls a write operation of the data to the disk 10B and selects the storage destination of the write data. In addition, the MPU 60B controls a read operation of the data from the disk 10B and controls the process of the read data. The MPU 60B is connected to respective units of the magnetic disk device 1. The MPU 60B is electrically connected to the driver IC 20, the R/W channel 40B, the HDC 50B, and the like, for example.

The MPU 60B includes a read/write controller 610B, an internal log management unit 620B, a refresh processing unit 630B, and the like. The MPU 60B executes the process of each of these units, for example, the read/write controller 610B, the internal log management unit 620B, the refresh processing unit 630B, and the like on the firmware. The MPU 60B may include the respective units, for example, the read/write controller 610B, the internal log management unit 620B, the refresh processing unit 630B, and the like as circuits.

The read/write controller 610B controls the read process and the write process of data according to a command from the host 100. The read/write controller 610B controls the VCM 14 via the driver IC 20, positions the head 15B at a target position on the disk 10B, and reads or writes data.

The internal log management unit 620B manages the internal log. The internal log management unit 620B manages the internal log as a table. The internal log management unit 620B develops (disposes or temporarily stores) the internal log table TBB corresponding to the actuator 16B (the disk 10B, the head 15B, and the system controller 130B) in a volatile recording region, for example, volatile memory 70, to perform a process such as updating. For example, when the internal log table TBB is the ATI management table, every time data is written to a track located in the radial direction of a particular track, for example, to an adjacent track adjacent to the particular track, a particular number of times, for example, once, the internal log management unit 620B increases the ATI count corresponding to this track of the internal log table TBB developed to the volatile memory 70 by a particular value, for example, by one. When the internal log table TBB is the ATI management table, and the data is written to the particular track, the internal log management unit 620B clears the ATI count corresponding to this particular track of the internal log table TBB developed to the volatile memory 70, for example, makes the ATI count zero.

The internal log management unit 620B periodically records the internal log table TBB developed to the volatile recording region, for example, the volatile memory 70, in the non-volatile recording region, for example, the system area 10B2 of the disk 10B. When the internal log management unit 620B records the internal log table TBB developed in the volatile recording region, for example, the volatile memory 70, in the non-volatile recording region, for example, the system area 10B2 of the disk 10B, the internal log management unit 620B adds a time-stamp to the internal log table TBB and record it in the system area 10B2 of the disk 10B.

When the system controller 130B is in a busy state, the internal log management unit 620B writes the internal log table TBB to a system area of another disk 10, other than the disk 10B, for example, the system area 10A2 of the disk 10A, corresponding to a system controller 130 that is not in a busy state.

When the system controller 130B is not in a busy state, the internal log management unit 620B writes an internal log table corresponding to another actuator 16 (another disk other than the disk 10B, another head other than the head 15B, or another system controller other than the system controller 130B) or the like, other than the actuator 16B, controlled by another system controller 130, other than the system controller 130B, which is in a busy state, for example, the internal log table TBA corresponding to the actuator 16A (the disk 10A, the head 15A, and the system controller 130A), to the non-volatile recording region, for example, to the system area 10B2 of disk 10B. When the system controller 130B is not in a busy state, the internal log management unit 620B may write the internal log table TBB to a non-volatile recording region, for example, the system area 10B2 of the disk 10B.

When the power of the magnetic disk device 1 is turned off, or when the power of the magnetic disk device 1 is cut off, the internal log management unit 620B clears the ATI count corresponding to each track of the disk 10B included in the internal log table TBB, for example, the ATI management table TBB, recorded in the volatile recording region, for example, the volatile memory 70 or the like, for example, makes the ATI count zero.

When the power of the magnetic disk device 1 is turned on, the internal log management unit 620B detects the time-stamp added to the internal log table TBB corresponding to the actuator 16B (the disk 10B, the head 15B, and the system controller 130B) recorded in all non-volatile recording regions, for example, all system areas of the disk 10, and generates (constructs or reconstructs) an internal log table including the newest (for example, largest) time-stamp in a volatile recording region, for example, the volatile memory 70. The internal log management unit 620B may update the internal log table TBB recorded in all or part of the non-volatile recording region, for example, the system area of the disk 10, to the internal log table TBB generated (constructed or reconstructed) in the volatile recording region, for example, the volatile memory 70 at startup.

The refresh processing unit 630B performs the refresh process. The refresh processing unit 630B refers to the internal log table TBB corresponding to the ATI management table, and when the ATI count corresponding to a particular track of the disk 10B exceeds the refresh threshold, performs a refresh process on this track.

FIG. 3 is a schematic diagram showing an example of the ATI count to be increased for the surrounding region according to the number of times data is written to a particular track 0. The horizontal axis indicates the track position relative to the track to which data was written, and the vertical axis indicates the ATI count to be increased when the data is written once to the track corresponding to 0 on the horizontal axis. FIG. 3 shows a line of a plurality of ATI counts measured with a plurality of heads with different characteristics.

In the example shown in FIG. 3, when data is written to a particular track once, one is added to the ATI count of the at least adjacent track.

FIG. 4 is a schematic diagram showing an example of the internal log tables TBA and TBB. In FIG. 4, the internal log tables TBA and TBB correspond to the ATI management table.

In the example shown in FIG. 4, the internal log table (ATI management table) TBA and TBB includes the head (HEAD) numbers, the time-stamp [sec], and the ATI count corresponding to each cylinder (track) of each disk 10A and 10B.

FIG. 5 is a schematic diagram showing an example of the management method of the internal log tables TBA and TBB according to the present embodiment.

In the example shown in FIG. 5, when the system controller 130A is in a busy state at the timing of recording the internal log table TBA developed in the volatile memory 70 in the system area 10A2 of the disk 10A, the system controller 130A records the internal log table TBA to which a time-stamp is added in the system area 10B2 of the disk 10B via the system controller 130B which is not in a busy state.

In the example shown in FIG. 5, when the system controller 130B is in a busy state at the timing of recording the internal log table TBB developed in the volatile memory 70 in the system area 10B2 of the disk 10B, the system controller 130B records the internal log table TBB to which a time-stamp is added in the system area 10A2 of the disk 10A via the system controller 130A which is not in a busy state.

Figure 6:
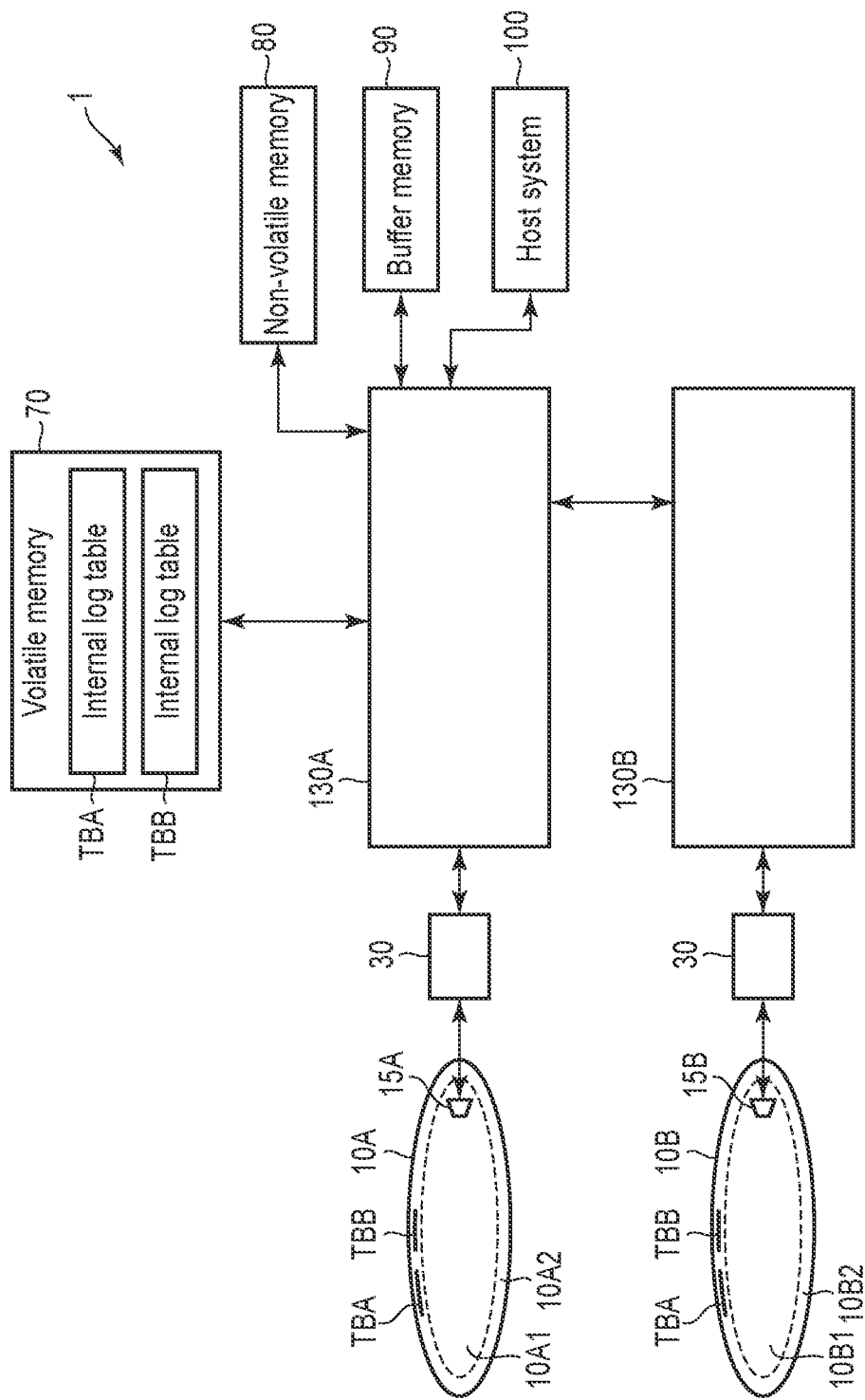
FIG. 6 is a schematic diagram showing an example of the management method of the internal log table according to the embodiment.

FIG. 6 is a schematic diagram showing an example of the management method of the internal log tables TBA and TBB according to the present embodiment.

In the example shown in FIG. 6, when the system controller 130A is not in a busy state at the timing of recording the internal log table TBA developed in the volatile memory 70 in the system area 10A2 of the disk 10A, the system controller 130A records the internal log table TBA to which a time-stamp is added in the system area 10A2 of the disk 10A.

In the example shown in FIG. 6, when the system controller 130A is in a busy state at the timing of recording the internal log table TBA developed in the volatile memory 70 in the system area 10A2 of the disk 10A, the system controller 130A records the internal log table TBA to which a time-stamp is added in the system area 10B2 of the disk 10B via the system controller 130B which is not in a busy state.

In the example shown in FIG. 6, when the system controller 130B is not in a busy state at the timing of recording the internal log table TBB developed in the volatile memory 70 in the system area 10B2 of the disk 10B, the system controller 130B records the internal log table TBB to which a time-stamp is added in the system area 10B2 of the disk 10B.

In the example shown in FIG. 6, when the system controller 130B is in a busy state at the timing of recording the internal log table TBB developed in the volatile memory 70 in the system area 10B2 of the disk 10B, the system controller 130B records the internal log table TBB to which a time-stamp is added in the system area 10A2 of the disk 10A via the system controller 130A which is not in a busy state.

Figure 7:
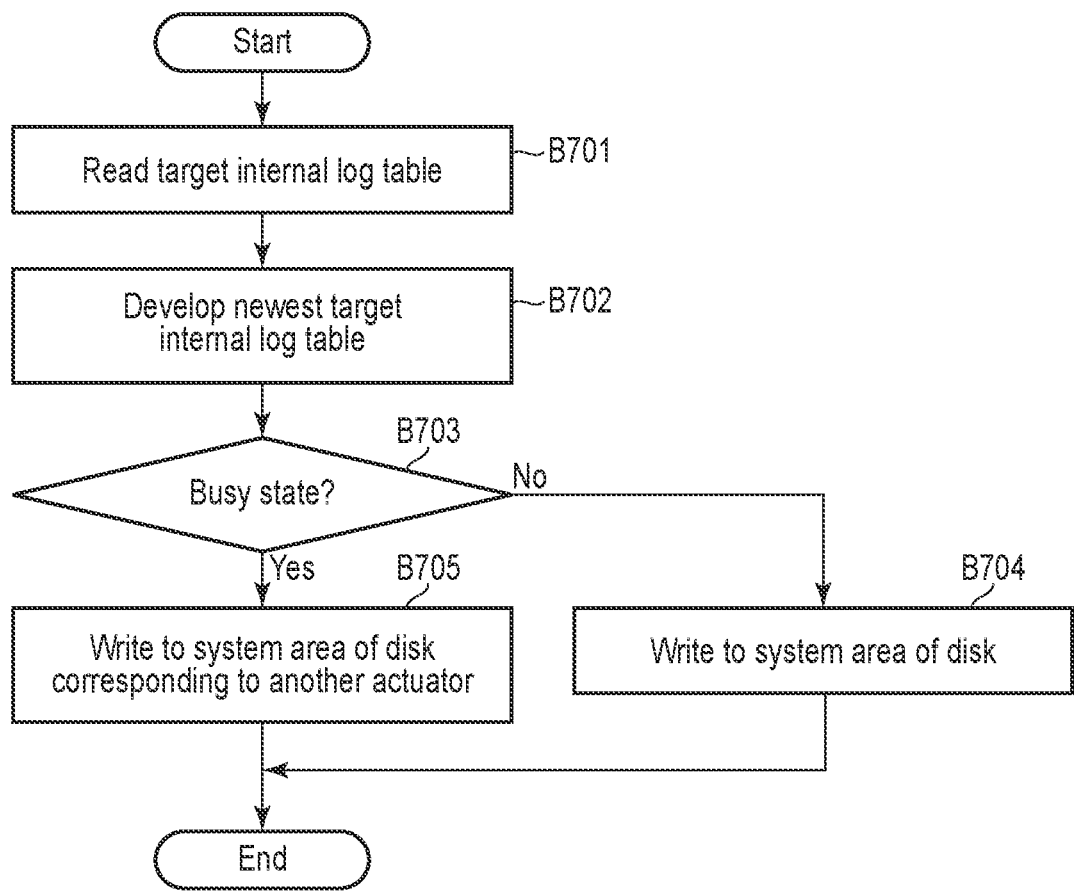
FIG. 7 is a flowchart showing an example of the management method of the internal log table according to the embodiment.

FIG. 7 is a flowchart showing an example of the management method of the internal log table according to the present embodiment.

The system controller 130 reads the internal log table (hereinafter, may be referred to as a target internal log table) corresponding to an actuator (hereinafter, may be referred to as a target actuator) 16 controlled by a target system controller (hereinafter, may be referred to as a target system controller) 130, a disk 10 corresponding to the target system controller 130 (hereinafter, may be referred to as a target disk 10), and a head 15 corresponding to the target system controller 130 (hereinafter, may be referred to as a target head 15), and the like from a particular non-volatile recording region, for example, the system area, of all disks 10 (B701). The system controller 130 develops (or constructs) the newest target internal log table among the plurality of target internal log tables recorded in a particular non-volatile recording region, for example, the system area, of the plurality of disks 10 in a particular volatile recording region, for example, the volatile memory 70 (B702). For example, the system controller 130 develops (or constructs) the target internal log table having the largest time-stamp among the plurality of target internal log tables recorded in a particular non-volatile recording region, for example, the system area, of the plurality of disks 10 in a particular volatile recording region, for example, the volatile memory 70. The system controller 130 determines whether the target system controller 130 is in a busy state or not (B703). When it is determined that the target system controller 130 is not in a busy state (No in B703), the system controller 130 writes the target internal log table, corresponding to the target system controller 130, recorded in a particular volatile recording region, for example, the volatile memory 70, to a particular non-volatile recording region, for example, the system area, of the target disk 10 (B704), and ends the process. When it is determined that the target system controller 130 is in a busy state (Yes in B703), the system controller 130 writes the target internal log table recorded in a particular volatile recording region, for example, the volatile memory 70 to a particular non-volatile recording region, for example, the system area, of another disk, other than the target disk 10, corresponding to another actuator 16, other than the target actuator 16, controlled by another system controller 130, other than the target system controller 130, in which the target system controller 130 is not in a busy state (B705), and ends the process.

According to the embodiment when the target system controller 130 is in a busy state, the magnetic disk device 1 records the target internal log table corresponding to the target disk 10, the target head 15, the target actuator 16, the target system controller 130, and the like in the system area of another disk 10, other than the target disk 10, corresponding to another system controllers 130, other than the target system controller 130, which is not in a busy state. When started after the power is turned off, or after the power is cut off, the magnetic disk device 1 can generate (constructs or reconstructs) the target internal log table in the volatile memory 70 based on the target internal log table corresponding to the target disk 10, the target head 15, the target actuator 16, the target system controller 130, and the like recorded in the system area of the particular disk 10. Therefore, the magnetic disk device 1 can improve the reliability of data while maintaining the performance of write/read processing.

Next, a magnetic disk device according to modifications of the embodiment will be described. In the modifications, the same reference numerals are attached to the same parts as those in the above embodiment, and a detailed description thereof will be omitted.

Modification 1

The magnetic disk device 1 according to Modification 1 has a different number of actuators from the magnetic disk device 1 of the above-described embodiment.

The disk 10 has, for example, disks 10A, 10B, and 10C. The disk 10 may have four or more disks. Further, the disk 10C may have two or more disks. The head 15 has, for example, heads 15A, 15B, and 15C. The head 15 may have four or more heads. Further, the head 15C may have two or more heads.

The actuator 16 has actuators 16A, 16B, and 16C. The actuator 16 may have four or more actuators. The actuator 16C is mounted on a common pivot and can rotate independently around the pivot. The actuator 16C controls the movement of the head 15C mounted on the arm to a particular position on the disk 10C by driving the VCM. The actuator 16C may include the head 15C, the driver IC 20, and the head amplifier IC 30.

In the disk 10, a user data region that can be used by a user and a system area to which information necessary for the system management is written are allocated in a region to which the data can be written. For example, the disk 10A is allocated a user data region 10A1 and a system area 10A2. For example, the disk 10B is allocated a user data region 10B1 and a system area 10B2. For example, the disk 10C is allocated a user data region 10C1 and a system area 10C2. Hereinafter, a direction orthogonal to the radial direction of the disk 10 is referred to as a circumferential direction.

The system controller 130 includes, for example, system controllers 130A, 130B, and 130C. For example, the system controller 130C is electrically connected to the driver IC 20, the head amplifier IC 30, and the system controller 130B. The system controller 130 may have four or more system controllers 130.

FIG. 8 is a schematic diagram showing a configuration example of the system controller 130 according to Modification 1.

The system controller (controller) 130C includes a read/write (R/W) channel 40C, an HDC 50C, and an MPU 60C. The system controller 130C is electrically connected to the driver IC 20, the head amplifier IC 30, the volatile memory 70, the nonvolatile memory 80, the buffer memory 90, the system controller 130B, and the like.

The R/W channel 40C executes a signal process of read data transferred from the disk 10C to the host 100 and write data transferred from the host 100 in response to an instruction from the MPU 60C to be described later. The R/W channel 40C has a circuit or a function of measuring a signal quality of read data. The R/W channel 40C is electrically connected to the head amplifier IC 30, the HDC 50C, the MPU 60C, and the like, for example.

The HDC 50C controls data transfer between the host 100 and the R/W channel 40C in response to an instruction from the MPU 60C described later. The HDC 50C is electrically connected to, for example, the R/W channel 40C, the MPU 60C, the system controller 130B, and the like.

The MPU 60C is a main controller that controls respective units of the magnetic disk device 1. The MPU 60C controls the actuator 16C (VCM) via the driver IC 20 and executes servo control that positions the head 15C. The MPU 60C controls a write operation of the data to the disk 10C and selects the storage destination of the write data. In addition, the MPU 60C controls a read operation of the data from the disk 10C and controls the process of the read data. The MPU 60C is connected to respective units of the magnetic disk device 1. The MPU 60C is electrically connected to the driver IC 20, the R/W channel 40C, the HDC 50C, and the like, for example.

The MPU 60C includes a read/write controller 610C, an internal log management unit 620C, and a refresh processing unit 630C. The MPU 60C executes process of each of these units, such as the read/write controller 610C, the internal log management unit 620C, and the refresh processing unit 630C, on the firmware. The MPU 60C may include the respective units, for example, the read/write controller 610C, the internal log management unit 620C, the refresh processing unit 630C, and the like as circuits.

The read/write controller 610C controls the read process and the write process of data according to a command from the host 100. The read/write controller 610C controls the VCM 14 via the driver IC 20, positions the head 15C at a target position on the disk 10C, and reads or writes data.

The internal log management unit 620C manages the internal log. The internal log management unit 620C manages the internal log as a table. The internal log management unit 620C develops (disposes or temporarily stores) the internal log table TBC corresponding to the actuator 16C (the disk 10C, the head 15C, and the system controller 130C) in a volatile recording region, for example, the volatile memory 70, to perform a process such as updating. For example, when the internal log table TBC is the ATI management table, every time data is written to a track located in the radial direction of a particular track, for example, to an adjacent track adjacent to the particular track, a particular number of times, for example, once, the internal log management unit 620C increases the ATI count corresponding to this track of the internal log table TBC developed to the volatile memory 70 by a particular value, for example, by one.

The internal log management unit 620C periodically records the internal log table TBC developed to the volatile recording region, for example, the volatile memory 70, in the non-volatile recording region, for example, the system area 10C2 of the disk 10C. When the internal log management unit 620C records the internal log table TBC developed in the volatile recording region, for example, the volatile memory 70, in the non-volatile recording region, for example, the system area 10C2 of the disk 10C, the internal log management unit 620C adds a time-stamp to the internal log table TBC and record it in the system area 10C2 of the disk 10C.

When the system controller 130C is in a busy state, the internal log management unit 620C writes the internal log table TBC to a system area of another disk 10, other than the disk 10C, corresponding to the system controller 130 that is not in a busy state, for example, the system area 10A2 of the disk 10A and/or the system area 10B2 of the disk 10B.

When the system controller 130C is not in a busy state, the internal log management unit 620C writes an internal log table corresponding to another actuator 16 (another disk 10 other than the disk 10C, another head 15 other than the head 15C, or another controller 130 other than the system controller 130C) or the like, other than the actuator 16C, controlled by another system controller 130, other than the system controller 130C, which is in a busy state, for example, the internal log table TBC corresponding to the actuator 16C (the disk 10C, the head 15C, and the system controller 130C) described later, to the non-volatile recording region, for example, the system area 10C2 of disk 10C. When the system controller 130C is not in a busy state, the internal log management unit 620C may write the internal log table TBC to a non-volatile recording region, for example, the system area 10C2 of the disk 10C.

When the power of the magnetic disk device 1 is turned off, or when the power of the magnetic disk device 1 is cut off, the internal log management unit 620C clears the ATI count corresponding to each track of the disk 10C included in the internal log table TBC, for example, the ATI management table TBC, recorded in the volatile recording region, for example, the volatile memory 70 or the like, for example, makes the ATI count zero.

When the power of the magnetic disk device 1 is turned on, the internal log management unit 620C detects the time-stamp added to the internal log table TBC corresponding to the actuator 16C (the disk 10C, the head 15C, and the system controller 130C) recorded in all non-volatile recording regions, for example, all system areas of the disk 10, and generates (constructs or reconstructs) an internal log table including the newest (for example, largest) time-stamp in a volatile recording region, for example, the volatile memory 70. The internal log management unit 620C may update the internal log table TBC recorded in all or part of the non-volatile recording region, for example, the system area of the disk 10, to the internal log table TBC generated (constructed or reconstructs) in the volatile recording region, for example, the volatile memory 70 at startup.

The refresh processing unit 630C performs the refresh process. The refresh processing unit 630C refers to the internal log table TBC corresponding to the ATI management table, and when the ATI count corresponding to a particular track of the disk 10C exceeds the refresh threshold, performs a refresh process on this track.

Figure 9:
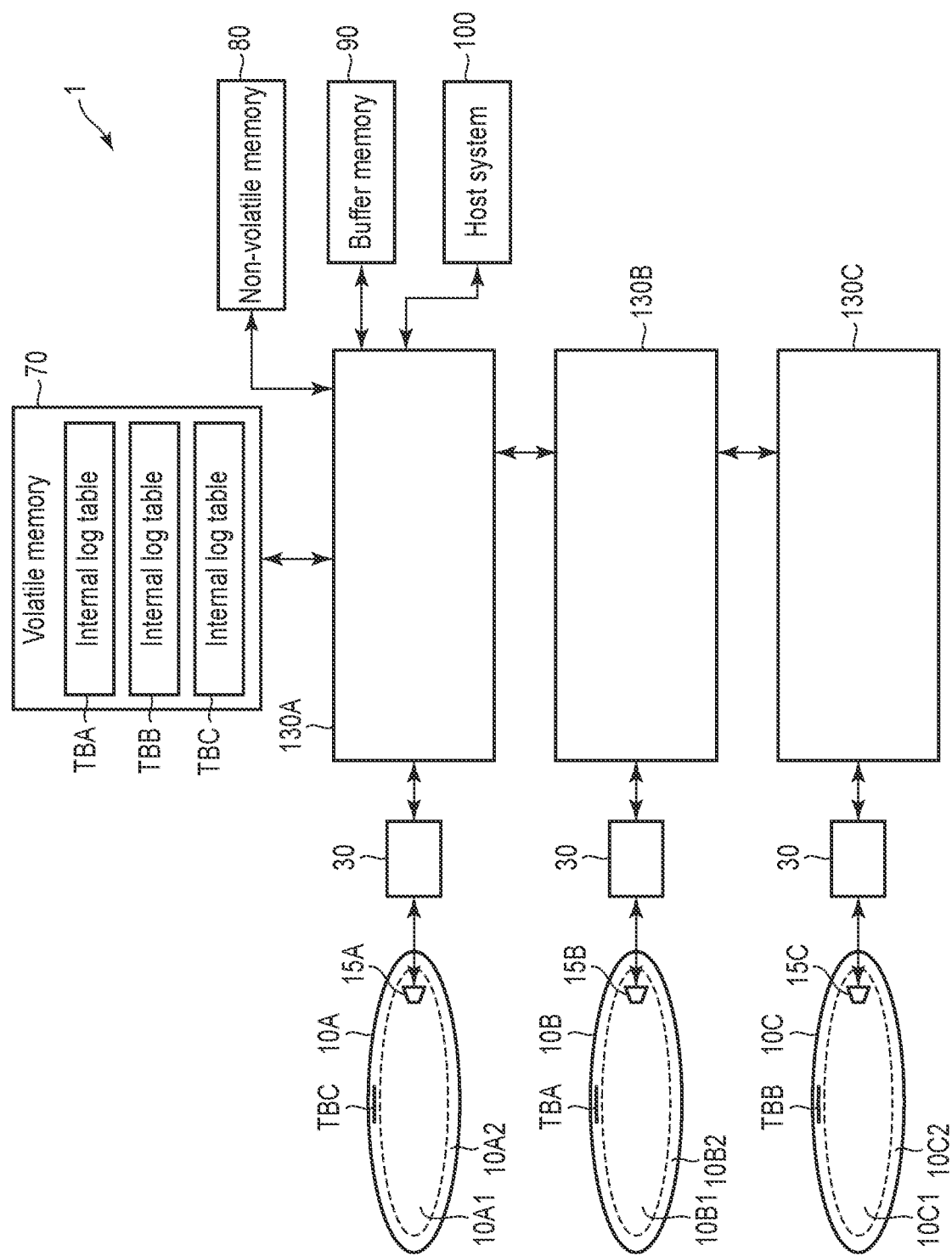
FIG. 9 is a schematic diagram showing an example of the management method of the internal log table according to Modification 1.

FIG. 9 is a schematic diagram showing an example of the management method of the internal log tables TBA, TBB, and TBC according to Modification 1.

In the example shown in FIG. 9, when the system controller 130A is in a busy state at the timing of recording the internal log table TBA developed in the volatile memory 70 in the system area 10A2 of the disk 10A, the system controller 130A records the internal log table TBA to which a time-stamp is added in the system area 10B2 of the disk 10B via the system controller 130B which is not in a busy state.

In the example shown in FIG. 9, when the system controller 130B is in a busy state at the timing of recording the internal log table TBB developed in the volatile memory 70 in the system area 10B2 of the disk 10B, the system controller 130B records the internal log table TBB to which a time-stamp is added in the system area 10C2 of the disk 10C via the system controller 130C which is not in a busy state.

In the example shown in FIG. 9, when the system controller 130C is in a busy state at the timing of recording the internal log table TBC developed in the volatile memory 70 in the system area 10C2 of the disk 10C, the system controller 130C records the internal log table TBC to which a time-stamp is added in the system area 10A2 of the disk 10A via the system controller 130A which is not in a busy state.

Figure 10:
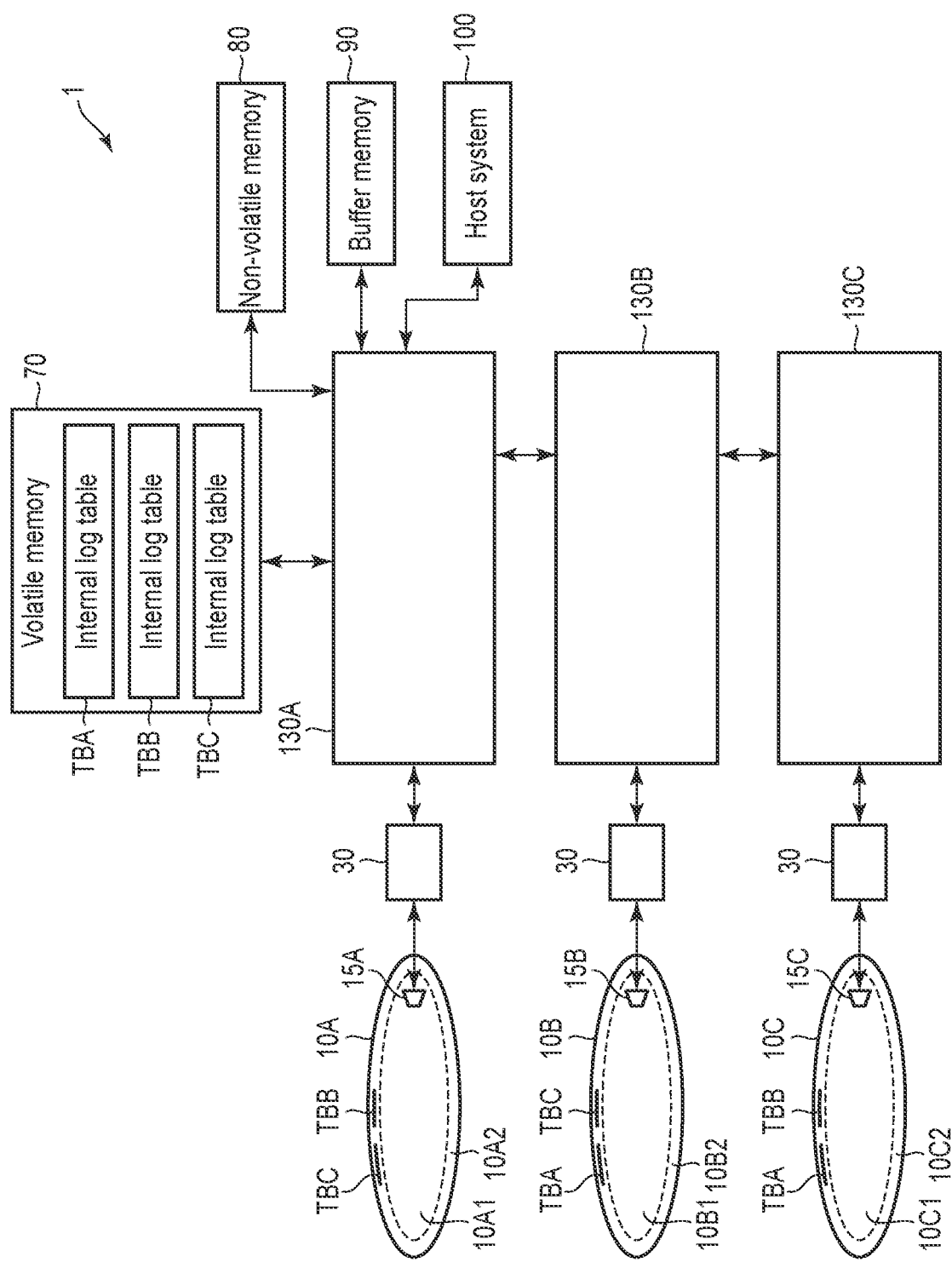
FIG. 10 is a schematic diagram showing an example of the management method of the internal log table according to Modification 1.

FIG. 10 is a schematic diagram showing an example of the management method of the internal log tables TBA, TBB, and TBC according to Modification 1.

In the example shown in FIG. 10, when the system controller 130A is in a busy state at the timing of recording the internal log table TBA developed in the volatile memory 70 in the system area 10A2 of the disk 10A, the system controller 130A records the internal log table TBA to which a time-stamp is added in the system area 10B2 of the disk 10B via the system controller 130B which is not in a busy state.

In the example shown in FIG. 10, when the system controller 130A is in a busy state at the timing of recording the internal log table TBA developed in the volatile memory 70 in the system area 10A2 of the disk 10A, the system controller 130A records the internal log table TBA to which a time-stamp is added in the system area 10C2 of the disk 10C via the system controller 130C which is not in a busy state.

In the example shown in FIG. 10, when the system controller 130B is in a busy state at the timing of recording the internal log table TBB developed in the volatile memory 70 in the system area 10B2 of the disk 10B, the system controller 130B records the internal log table TBB to which a time-stamp is added in the system area 10C2 of the disk 10C via the system controller 130C which is not in a busy state.

In the example shown in FIG. 10, when the system controller 130B is in a busy state at the timing of recording the internal log table TBB developed in the volatile memory 70 in the system area 10B2 of the disk 10B, the system controller 130B records the internal log table TBB to which a time-stamp is added in the system area 10A2 of the disk 10A via the system controller 130A which is not in a busy state.

In the example shown in FIG. 10, when the system controller 130C is in a busy state at the timing of recording the internal log table TBC developed in the volatile memory 70 in the system area 10C2 of the disk 10C, the system controller 130C records the internal log table TBC to which a time-stamp is added in the system area 10A2 of the disk 10A via the system controller 130A which is not in a busy state.

In the example shown in FIG. 10, when the system controller 130C is in a busy state at the timing of recording the internal log table TBC developed in the volatile memory 70 in the system area 10C2 of the disk 10C, the system controller 130C records the internal log table TBC to which a time-stamp is added in the system area 10B2 of the disk 10B via the system controller 130B which is not in a busy state.

Figure 11:
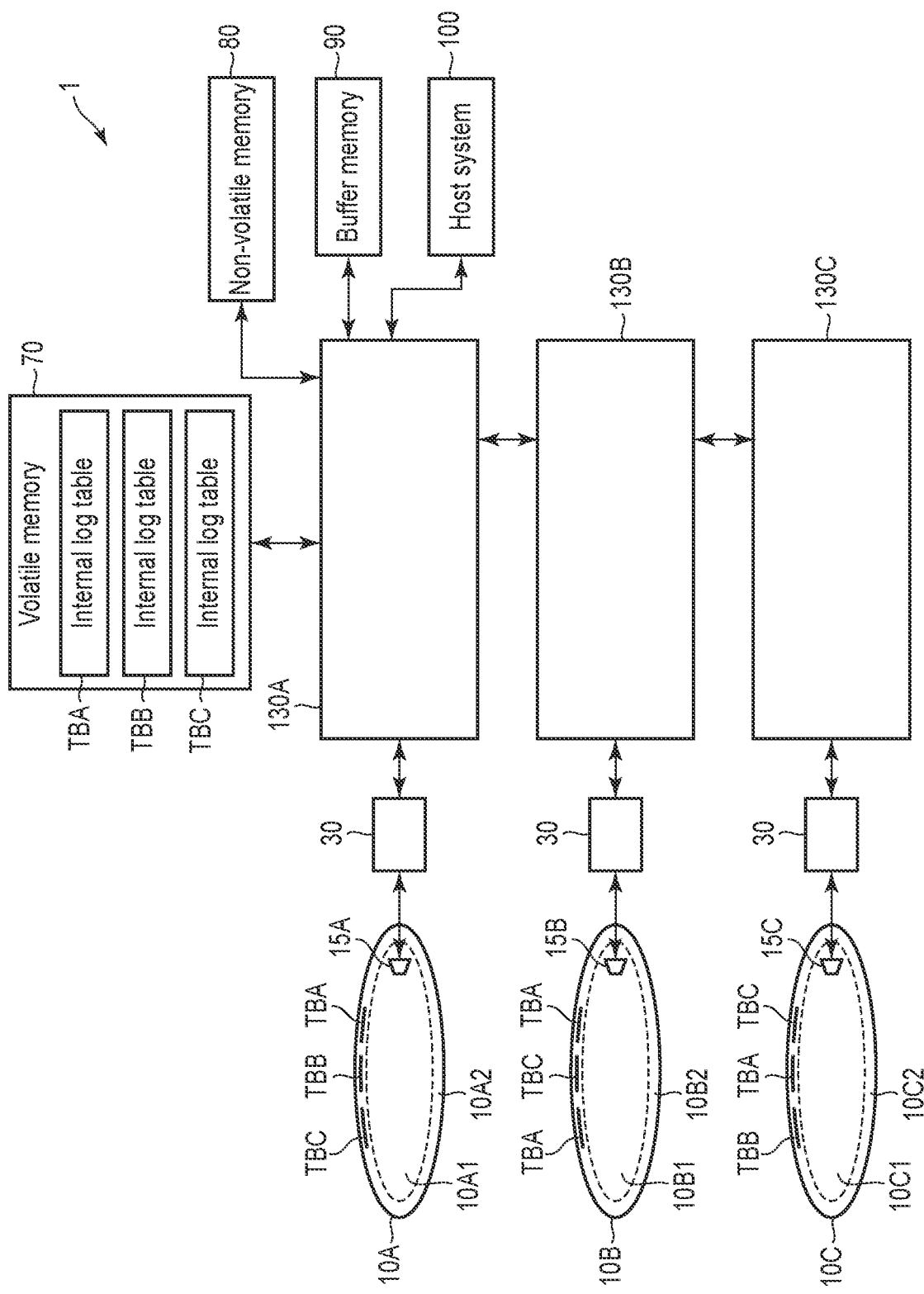
FIG. 11 is a schematic diagram showing an example of the management method of the internal log table according to Modification 1.

FIG. 11 is a schematic diagram showing an example of the management method of the internal log tables TBA, TBB, and TBC according to Modification 1.

In the example shown in FIG. 11, when the system controller 130A is not in a busy state at the timing of recording the internal log table TBA developed in the volatile memory 70 in the system area 10A2 of the disk 10A, the system controller 130A records the internal log table TBA to which a time-stamp is added in the system area 10A2 of the disk 10A.

In the example shown in FIG. 11, when the system controller 130A is in a busy state at the timing of recording the internal log table TBA developed in the volatile memory 70 in the system area 10A2 of the disk 10A, the system controller 130A records the internal log table TBA to which a time-stamp is added in the system area 10B2 of the disk 10B via the system controller 130B which is not in a busy state.

In the example shown in FIG. 11, when the system controller 130A is in a busy state at the timing of recording the internal log table TBA developed in the volatile memory 70 in the system area 10A2 of the disk 10A, the system controller 130A records the internal log table TBA to which a time-stamp is added in the system area 10C2 of the disk 10C via the system controller 130C which is not in a busy state.

In the example shown in FIG. 11, when the system controller 130B is not in a busy state at the timing of recording the internal log table TBB developed in the volatile memory 70 in the system area 10B2 of the disk 10B, the system controller 130B records the internal log table TBB to which a time-stamp is added in the system area 10B2 of the disk 10B.

In the example shown in FIG. 11, when the system controller 130B is in a busy state at the timing of recording the internal log table TBB developed in the volatile memory 70 in the system area 10B2 of the disk 10B, the system controller 130B records the internal log table TBB to which a time-stamp is added in the system area 10C2 of the disk 10C via the system controller 130C which is not in a busy state.

In the example shown in FIG. 11, when the system controller 130B is in a busy state at the timing of recording the internal log table TBB developed in the volatile memory 70 in the system area 10B2 of the disk 10B, the system controller 130B records the internal log table TBB to which a time-stamp is added in the system area 10A2 of the disk 10A via the system controller 130A which is not in a busy state.

In the example shown in FIG. 11, when the system controller 130C is not in a busy state at the timing of recording the internal log table TBC developed in the volatile memory 70 in the system area 10C2 of the disk 10C, the system controller 130C records the internal log table TBC to which a time-stamp is added in the system area 10C2 of the disk 10C.

In the example shown in FIG. 11, when the system controller 130C is in a busy state at the timing of recording the internal log table TBC developed in the volatile memory 70 in the system area 10C2 of the disk 10C, the system controller 130C records the internal log table TBC to which a time-stamp is added in the system area 10A2 of the disk 10A via the system controller 130A which is not in a busy state.

In the example shown in FIG. 11, when the system controller 130C is in a busy state at the timing of recording the internal log table TBC developed in the volatile memory 70 in the system area 10C2 of the disk 10C, the system controller 130C records the internal log table TBC to which a time-stamp is added in the system area 10B2 of the disk 10B via the system controller 130B which is not in a busy state.

According to Modification 1, the magnetic disk device 1 can improve the reliability of data while maintaining the performance of write/read processing.

An example of the magnetic disk device and the information management method obtained from the configuration disclosed in the present specification is added below.

(1) A magnetic disk device includes a first disk having a first user data region to which user data is written and a first system area different from the first user data region, a second disk having a second user data region to which user data is written and a second system area different from the second user data region, a first head that writes data to the first disk and that reads data from the first disk, a second head that writes data to the second disk and that reads data from the second disk, a first actuator having the first head, a second actuator having the second head, a first controller that controls the first disk, the first head, and the first actuator, and a second controller that controls the second disk, the second head, and the second actuator, wherein the first controller records first information related to the first head and the first disk in the second system area.

(2) The magnetic disk device according to (1), wherein the first controller records the first information in the first system area.

(3) The magnetic disk device according to (2), further including a volatile memory, wherein the first controller records the first information in the volatile memory.

(4) The magnetic disk device according to (3), wherein the first controller periodically records the first information that is updated with the volatile memory and to which a time-stamp is added in at least one of the first system area and the second system area.

(5) The magnetic disk device according to (4), wherein when the number of commands to be processed by the first controller is large, and when the number of commands to be processed by the second controller is small, the first controller records the first information that is updated with the volatile memory and to which a time-stamp is added in the second system area.

(6) The magnetic disk device according to (5), wherein when the number of commands to be processed by the first controller is small, the first controller records the first information that is updated with the volatile memory and to which a time-stamp is added in the first system area.

(7) The magnetic disk device according to (6), wherein at startup, the first controller records the first information having a larger time-stamp among the first information recorded in the first system area and the first information recorded in the second system area in the volatile memory.

(8) The magnetic disk device according to any one of (1) to (7), wherein the first information corresponds to a table showing a degree of influence of a leakage magnetic flux according to the number of times data is written to a region adjacent to the first disk in a radial direction.

(9) The magnetic disk device according to any one of (1) to (8), wherein the second controller records the second information related to the second head and the second disk in the first system area.

(10) The magnetic disk device according to (9), wherein the second controller records the second information in the volatile memory.

(11) The magnetic disk device according to (10), wherein the second controller periodically records the second information that is updated with the volatile memory and to which a time-stamp is added in at least one of the first system area and the second system area.

(12) The magnetic disk device according to (11), wherein when the number of commands to be processed by the second controller is large, and when the number of commands to be processed by the first controller is small, the second controller records the second information that is updated with the volatile memory and to which a time-stamp is added in the first system area.

(13) The magnetic disk device according to (12), wherein when the number of commands to be processed by the second controller is small, the second controller records the second information that is updated with the volatile memory and to which a time-stamp is added in the second system area.

(14) The magnetic disk device according to (13), wherein at startup, the second controller records the second information having a larger time-stamp among the second information recorded in the first system area and the second information recorded in the second system area in the volatile memory.

(15) The magnetic disk device according to any one of (9) to (14), wherein the second information corresponds to a table showing a degree of influence of a leakage magnetic flux according to the number of times data is written to a region adjacent to the disk in a radial direction.

(16) A magnetic disk device includes a plurality of disks each having a user data region to which user data is written and a system area different from the user data region, a plurality of heads that writes data to the plurality of respective disks and that reads data from the plurality of respective disks, a plurality of actuators having the plurality of respective heads, and a plurality of controllers that controls the plurality of disks, the plurality of heads, and the plurality of actuators, wherein a first controller among the plurality of controllers records first information related to a first head, among the plurality of heads, controlled by the first controller and a first disk, among the plurality of disks, which the first head faces in a system area of another disk, other than the first disk, among the plurality of disks.

(17) In an information management method applied to a magnetic disk device including a plurality of disks each having a user data region to which user data is written and a system area different from the user data region, a plurality of heads that writes data to the plurality of respective disks and that reads data from the plurality of respective disks, a plurality of actuators having the plurality of respective heads, and a plurality of controllers that controls the plurality of disks, the plurality of heads, and the plurality of actuators, the method includes recording first information related to a first head among the plurality of heads and a first disk, among the plurality of disks, which the first head faces in a system area of another disk, other than the first disk, among the plurality of disks.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a first disk having a first user data region to which user data is written and a first system area different from the first user data region;
   a second disk having a second user data region to which user data is written and a second system area different from the second user data region;
   a first head configured to write data to the first disk and read data from the first disk;
   a second head configured to write data to the second disk and read data from the second disk;
   a first actuator configured to move the first head;
   a second actuator configured to move the second head;
   a first controller configured to control the first disk, the first head, and the first actuator; and
   a second controller configured to control the second disk, the second head, and the second actuator, wherein
   the second controller controls the second head to record first information related to the first head and the first disk, in the second system area.

2. The magnetic disk device according to claim 1, wherein the first controller controls the first head to record the first information in the first system area.

3. The magnetic disk device according to claim 2, further comprising:
   a volatile memory, wherein
   the first controller records the first information in the volatile memory.

4. The magnetic disk device according to claim 3,
   wherein periodically, the first controller controls the first head to record the first information recorded in the volatile memory, in the first system area, or the second controller controls the second head to record the first information recorded in the volatile memory, in the second system area,
   wherein the first information recorded in the volatile memory and periodically recorded in the first or second system area is updated, and
   wherein a time-stamp is added to the updated first information.

5. The magnetic disk device according to claim 4,
   wherein when a number of commands to be processed by the first controller is large, and when a number of commands to be processed by the second controller is small, the second controller controls the second head to record the first information recorded in the volatile memory, in the second system area,
   wherein the first information recorded in the volatile memory and in the second system area is, and
   wherein a time-stamp is added to the updated first information recorded in the volatile memory and in the second system area.

6. The magnetic disk device according to claim 5,
   wherein when the number of commands to be processed by the first controller is small, the first controller controls the first head to record the first information recorded in the volatile memory, in the first system area, wherein the first information recorded in the volatile memory and in the first system area is updated, and wherein a time-stamp is added to the updated first information recorded in the volatile memory and in the first system area.

7. The magnetic disk device according to claim 6, wherein at startup, the first controller records the first information having a larger time-stamp among the first information recorded in the first system area and the first information recorded in the second system area, in the volatile memory.

8. The magnetic disk device according to claim 1, wherein the first information corresponds to a table showing a degree of influence of a leakage magnetic flux according to a number of times data is written to a region adjacent to the first disk in a radial direction.

9. The magnetic disk device according to claim 1, wherein the first controller controls the first head to record second information related to the second head and the second disk, in the first system area.

10. The magnetic disk device according to claim 9, wherein the second controller records the second information in a volatile memory.

11. The magnetic disk device according to claim 10, wherein periodically, the first controller controls the first head to record the second information recorded in the volatile memory, in the first system area, or the second controller controls the second head to record the second information recorded in the volatile memory, in the second system area, wherein the second information recorded in the volatile memory and periodically recorded in the first or second system area is updated, and wherein a time-stamp is added to the updated second information.

12. The magnetic disk device according to claim 11, wherein when a number of commands to be processed by the second controller is large, and when a number of commands to be processed by the first controller is small, the first controller controls the first head to record the second information recorded in the volatile memory, in the first system area, wherein the second information recorded in the volatile memory and in the first system area is updated, and wherein a time-stamp is added to the updated second information recorded in the volatile memory and in the first system area.

13. The magnetic disk device according to claim 12, wherein when the number of commands to be processed by the second controller is small, the second controller controls the second head to record the second information recorded in the volatile memory, in the second system area, wherein the second information recorded in the volatile memory and in the second system area is updated, and wherein a time-stamp is added to the second information recorded in the volatile memory and in the second system area.

14. The magnetic disk device according to claim 13, wherein at startup, the second controller records the second information having a larger time-stamp among the second information recorded in the first system area and the second information recorded in the second system area, in the volatile memory.

15. The magnetic disk device according to claim 9, wherein the second information corresponds to a table showing a degree of influence of a leakage magnetic flux according to a number of times data is written to a region adjacent to the second disk in a radial direction.

16. A magnetic disk device comprising:
a volatile memory;
a plurality of disks including a first disk and a second disk, each having a user data region to which user data is written and a system area different from the user data region;
a plurality of heads including a first head facing the first disk and a second head, configured to write data to respective disks and read data from the respective disks;
a plurality of actuators configured to move respective heads; and
a plurality of controllers including a first controller and a second controller, configured to control the disks, the heads, and the actuators, wherein
the second controller controls the second head to record first information related to the first head, the system area of the second disk.

17. The magnetic disk device according to claim 16, wherein the first controller controls the first head to record the first information in the system area of the first disk and records the first information in the volatile memory.

18. The magnetic disk device according to claim 17, wherein periodically, one of the plurality of controllers controls one of the plurality of heads to record the first information recorded in the volatile memory, in the system area of one of the plurality of disks, wherein the first information recorded in the volatile memory and periodically recorded in the system area of the one of the plurality of disks is updated, and wherein a time-stamp is added to the updated first information.

19. An information management method applied to a magnetic disk device including a volatile memory, a plurality of disks including a first disk and a second disk, each having a user data region to which user data is written and a system area different from the user data region, a plurality of heads including a first head facing the first disk and a second head, configured to write data to respective disks and read data from the respective disks, a plurality of actuators configured to move respective heads, and a plurality of controllers including a first controller and a second controller, configured to control the disks, the heads, and the actuators, the method comprising:

by the second controller, controlling the second head to record first information related to the first head, in the system area of the second disk.

20. The information management method according to claim 19, further comprising:

by the first controller, controlling the first head to record the first information in the system area of the first disk and record the first information in the volatile memory; and periodically, by one of the plurality of controllers, controlling one of the plurality of heads, to record the first information, which is updated with the volatile memory and to which a time-stamp is added, in the system area of one of the plurality of disks.

* * * * *

UNITED STATES PATENT AND TRADEMARK OFFICE
CERTIFICATE OF CORRECTION

| | |
|---|---|
| PATENT NO. | : 11,450,343 B2 |
| APPLICATION NO. | : 17/198137 |
| DATED | : September 20, 2022 |
| INVENTOR(S) | : Masatsugu Nishida |

It is certified that error appears in the above-identified patent and that said Letters Patent is hereby corrected as shown below:

In the Claims

Column 18, Line 58, insert --updated-- after "is".
Column 20, Line 21, insert --in-- after "head,".

Signed and Sealed this
Twenty-fourth Day of October, 2023

Katherine Kelly Vidal
*Director of the United States Patent and Trademark Office*